(12) United States Patent
Krishnamoorthi et al.

(10) Patent No.: US 11,405,668 B2
(45) Date of Patent: Aug. 2, 2022

(54) SYSTEMS AND METHODS FOR VIEWING-SESSION CONTINUITY

(71) Applicant: Rovi Guides, Inc., San Jose, CA (US)

(72) Inventors: Santhiya Krishnamoorthi, Tamil Nadu (IN); Vikram Makam Gupta, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/085,921

(22) Filed: Oct. 30, 2020

(65) Prior Publication Data

US 2022/0141510 A1 May 5, 2022

(51) Int. Cl.
| | | |
|---|---|---|
| *H04N 21/2343* | (2011.01) | |
| *H04N 21/2387* | (2011.01) | |
| *H04N 21/2347* | (2011.01) | |
| *H04N 21/258* | (2011.01) | |
| *H04N 21/442* | (2011.01) | |

(52) U.S. Cl.
CPC . *H04N 21/234363* (2013.01); *H04N 21/2347* (2013.01); *H04N 21/2387* (2013.01); *H04N 21/23439* (2013.01); *H04N 21/25825* (2013.01); *H04N 21/25891* (2013.01); *H04N 21/44218* (2013.01)

(58) Field of Classification Search
None
See application file for complete search history.

(56) References Cited

U.S. PATENT DOCUMENTS

| | | | | |
|---|---|---|---|---|
| 7,606,929 | B2 * | 10/2009 | Gbadegesin | H04L 29/12009 709/235 |
| 7,761,892 | B2 | 7/2010 | Ellis et al. | |
| 8,046,801 | B2 | 10/2011 | Ellis et al. | |
| 8,213,915 | B1 * | 7/2012 | Upadhyay | H04L 67/145 455/414.3 |
| 10,194,204 | B1 * | 1/2019 | Don | G06Q 10/02 |
| 11,023,134 | B1 * | 6/2021 | Rao | G06F 3/061 |
| 2005/0251827 | A1 | 11/2005 | Ellis et al. | |
| 2006/0080703 | A1 * | 4/2006 | Compton | H04N 7/17336 725/34 |
| 2006/0123131 | A1 * | 6/2006 | Almaula | H04L 65/4092 709/231 |
| 2006/0291412 | A1 * | 12/2006 | Naqvi | H04W 48/16 370/328 |
| 2007/0042710 | A1 * | 2/2007 | Mahini | H04L 63/10 455/3.03 |
| 2012/0210343 | A1 * | 8/2012 | McCoy | H04N 21/25875 725/25 |
| 2013/0110978 | A1 * | 5/2013 | Gordon | H04N 21/4627 709/218 |

(Continued)

*Primary Examiner* — Nasser M Goodarzi
*Assistant Examiner* — Terrika Peterson
(74) *Attorney, Agent, or Firm* — Haley Guiliano LLP

(57) ABSTRACT

The present disclosure is generally directed to media systems configured to receive and play media assets. In particular, methods and systems are provided for improved media asset session continuity across such media systems. Systems and methods are provided herein for continuing media asset sessions across media systems or media devices in a way designed to minimize manual intervention, for example, by determining a likelihood (e.g., a probability) of a user requesting media session continuation of an ongoing media asset or a segment thereof across two or more devices.

14 Claims, 10 Drawing Sheets

(56) References Cited

U.S. PATENT DOCUMENTS

| | | | |
|---|---|---|---|
| 2015/0072662 A1* | 3/2015 | Chandrasekaran | H04W 4/18 455/414.1 |
| 2015/0381740 A1* | 12/2015 | Gwin | H04W 12/068 709/228 |
| 2018/0352286 A1* | 12/2018 | Rennison | H04N 21/4307 |
| 2019/0210522 A1* | 7/2019 | Huang | G08G 1/166 |
| 2020/0092562 A1* | 3/2020 | Choi | H04N 21/23439 |

* cited by examiner

SYSTEMS AND METHODS FOR VIEWING-SESSION CONTINUITY

BACKGROUND

This disclosure is generally directed to media systems configured to receive and play media assets. In particular, methods and systems are provided for improved media asset session continuity across such media systems.

SUMMARY

Media systems commonly generate for display media assets received from a remote device. For example, a media player may play streaming audio or video received from a media server via an internet connection. In today's media asset landscape, users are able to stream content using multiple devices, at a home or office environment or even on the go while using public transport or while driving, for example.

As an example scenario, the user may have initiated a media session on their mobile or tablet device connecting to a content source such as YouTube or any other OTT provider. When the user starts or stops a journey, for example as the user is commuting to and from the office, the user may wish or expect for the content they were viewing on their journey to continue seamlessly at a home or remote device. Upon the user reaching their home or car, the user may wish to have the media session of the content continue, immediately or without any substantial interruption, on their TV screen at home or on a mobile or remote device integrated into a vehicle system.

In conventional methods, however, users may be required to initiate a transfer process for the media asset across media systems. This typically involves manual user input such as switching on a media system, browsing through content, and going through the steps of user authentication. This can result in a laborious transfer process for media session continuity that may not be particularly user-friendly. There may also be additional factors that can lengthen the period of interruption between the user's initial media viewing-session and the continuation thereof. For example, such factors may include, but are not limited to, the time taken to establish a connection between the media system and the content source, negotiating streaming parameters across media systems and downloading time for media session continuation.

It is essential to ensure that a large enough buffer is present in order to provide an uninterrupted user viewing experience once the media asset starts playing on a second media system, at home for example, and while the media session is ongoing. In order to support user experience and user preferences in the continuation of media assets, a sufficient buffer can be built up as the media system connects to the content source. Depending on parameters of the media asset, such as video resolution, the download bandwidth required can be significantly high. This problem is exacerbated by the fact that the user may rewind or fast-forward content when the media asset is transferred from one media system to another, such as from a mobile or tablet device to a TV screen. However, attempting to build the required buffer quickly consumes a large amount of bandwidth, especially for 8K screens for example, and this typically delays devices during content connection due to the data that is being downloaded to the screen, which contribute to further and/or longer interruption of the media session.

Thus, it is preferable to have a system that accomplishes improved viewing-session continuity for the user. It is further preferable to configure the viewing-session continuity based on the user's preferences or previous media asset or media session experiences and/or interactions.

Accordingly, to overcome these problems, systems and methods are provided herein for continuing media asset sessions across media systems or media devices in a way designed to minimize manual intervention. Systems and methods described herein leverage metadata of the media asset and data retrieved from a user profile to determine a likelihood (e.g., a probability) of a user requesting media session continuation of an ongoing media asset or a segment thereof across two or more devices.

In one implementation, the media asset is displayed at a first device having an established connection with a source of the media asset. A buffered portion is generated in relation to a segment of the media asset at the first device. A user's trajectory is determined by comparing a first location at which the user started watching the media asset with a current location and one or more alternative or second devices suitable for displaying the media asset can be identified.

A distance is determined between the first device and the second device and the buffered portion generated at the first device can be transferred to a personal locker when it is determined that the distance between the first device and the second device is within a first threshold distance. The buffered portion stored at the personal locker can then be further transferred to a selected or identified second device when it is determined that the distance between the first device and the second device is within a second threshold distance. The transferred buffered portion and a remainder of the media asset can be generated at the second device for concurrent display. In this way, interruption of content is avoided, resulting in smoother, faster operation system based on media content transfer.

In example implementations, a connection between the second media device and the media asset source can be established. In some implementations, the steps of generating the transferred buffered portion at the second device and establishing the connection between the second device and the source occur substantially simultaneously.

Alternatively, for example, a user's estimated time of arrival at the second device can be determined to be taken into account for media session continuation, more particularly for just-in-time media asset generation on the second device. This can be based on user velocity; user trajectory; traffic; and/or a remaining distance between the first and second device, for example.

In another implementation, the buffered portion of the media asset can be transferred to the second media device when it is further determined that the user has stopped consuming the media asset on the first device.

In another implementation, there may be provided a step of transcoding the buffered portion based on one or more parameters relevant to the second device as the buffered portion of the media asset is determined to be transferred from the first device to the personal locker. For example, the parameters may include, but are not limited to, aspect ratio, video resolution size, video format, and/or encryption.

In yet another implementation, there is provided a further step of determining a marker in relation to a time frame at which it is determined that the user has stopped consuming the media asset at the first device and displaying the media asset at the second device starting from the determined marker.

In another aspect, there is provided a method of providing continuity of availability of a media asset across devices when it is determined that the first device and the second device are within a same network range.

In this way, the operations of the media system as a whole can also be improved. This improvement is particularly relevant in scenarios when a user is streaming the media asset while on the go. It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which reference characters refer to like parts throughout, and in which.

DETAILED DESCRIPTION

Figure 1:
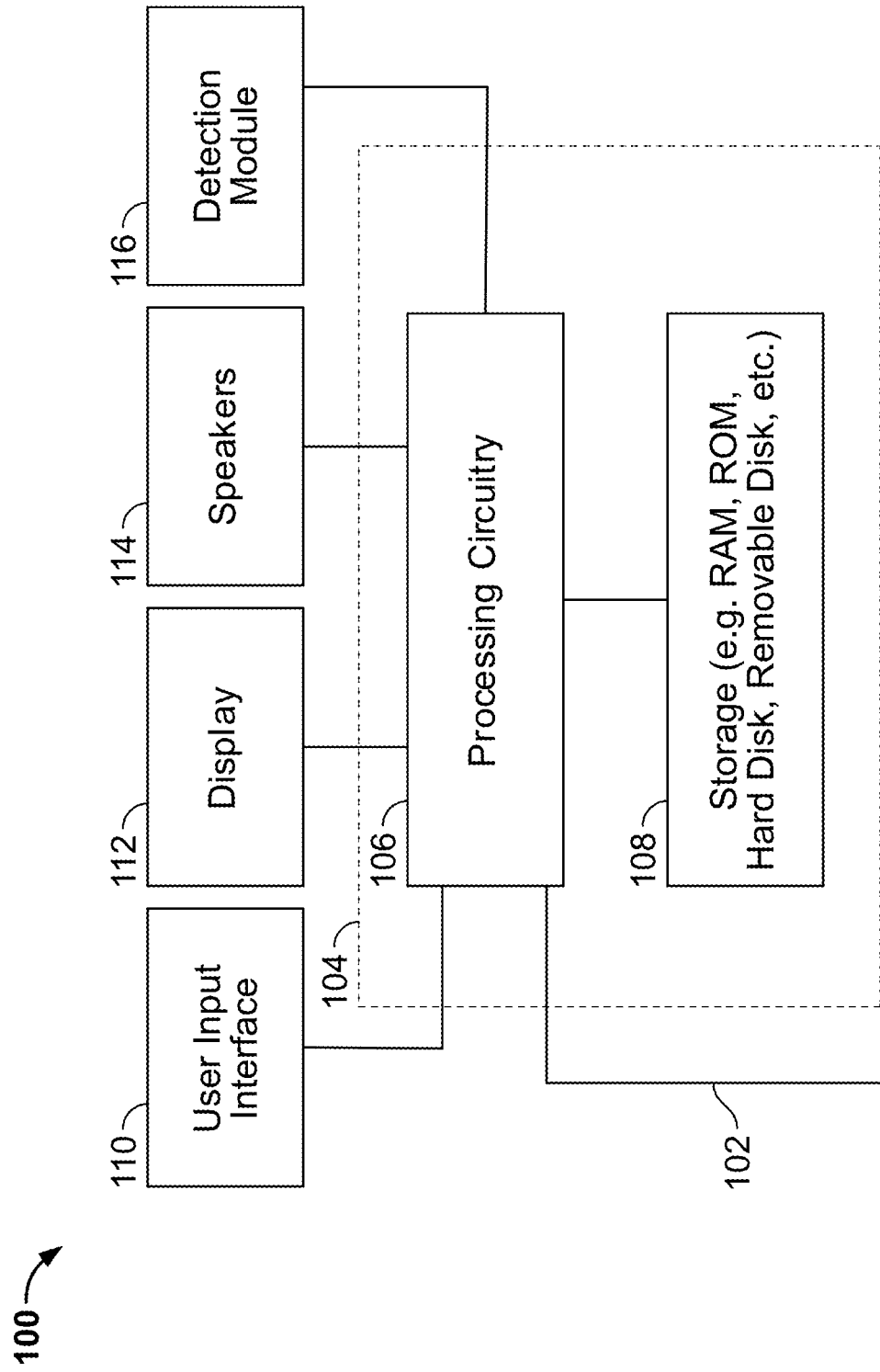
FIG. 1 is a block diagram of an illustrative user equipment device, in accordance with some embodiments of the present disclosure.

Methods and systems in accordance with the present disclosure are described herein that allow continuity of a media session or media asset from a remote source, such as a video from a OTT provider, based on a detected distance between at least two media systems or user devices. The media guidance application may also automatically determine a transfer of buffer data based on a current trajectory of the user and generate the media asset to be continued at a second device.

As referred to herein, a "media guidance application" or a "guidance application" is an application that provides media guidance data to a user through an interface. For example, a media guidance application may allow users to efficiently navigate content selections and easily identify content that they may desire. The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media cards, register memory, processor caches, Random Access Memory (RAM), etc.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

As referred to herein, the terms "media asset" and content should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content.

As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same.

Users may access content and the media guidance application (and its display screens described above and below) from one or more of their user equipment devices. FIG. 1 shows a generalized embodiment of illustrative user equipment device 100. More specific implementations of user equipment devices are discussed below in connection with FIG. 2. User equipment device 100 may receive content and data via input/output (hereinafter "I/O") path 102. I/O path 102 may provide content (e.g., broadcast programming, on-demand programming, Internet content, content available over a local area network (LAN) or wide area network (WAN), and/or other content) and data to control circuitry 104, which includes processing circuitry 106 and storage 108. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths, but are shown as a single path in FIG. 1 to avoid overcomplicating the drawing.

Control circuitry 104 may be based on any suitable processing circuitry such as processing circuitry 106. As referred to herein, processing circuitry should be understood to mean circuitry based on one or more microprocessors, microcontrollers, digital signal processors, programmable logic devices, field programmable gate arrays (FPGAs), application-specific integrated circuits (ASICs), etc., and may include a multi-core processor (e.g., dual-core, quad-core, hexacore, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 104 executes instructions for a media guidance application stored in memory (i.e., storage 108). Specifically, control circuitry 104 may be instructed by the media guidance application to perform the functions discussed above and below. For example, the media guidance application may provide instructions to control circuitry 104 to generate the media guidance displays. In some implementations, any action performed by control circuitry 104 may be based on instructions received from the media guidance application.

In client-server based embodiments, control circuitry 104 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 2). In addition, communications circuitry may include circuitry that enables peer-to-peer communication of user equipment devices, or communication of user equipment devices in locations remote from each other (described in more detail below).

Memory may be an electronic storage device provided as storage 108 that is part of control circuitry 104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 108 may be used to store various types of content described herein as well as media guidance data described above. Nonvolatile memory may also be used (e.g., to launch a boot-up routine and other instructions). Cloud-based storage, described in relation to FIG. 2, may be used to supplement storage 108 or instead of storage 108.

Control circuitry 104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 104 may also include scaler circuitry for upconverting and downconverting content into the preferred output format of the user equipment 100. Circuitry 104 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 108 is provided as a separate device from user equipment 100, the tuning and encoding circuitry (including multiple tuners) may be associated with storage 108.

A user may send instructions to control circuitry 104 using user input interface 110. User input interface 110 may be any suitable user interface, such as a remote control, mouse, trackball, keypad, keyboard, touch screen, touchpad, stylus input, joystick, voice recognition interface, or other user input interfaces. Display 112 may be provided as a stand-alone device or integrated with other elements of user equipment device 100. For example, display 112 may be a touchscreen or touch-sensitive display. In such circumstances, user input interface 112 may be integrated with or combined with display 112. Display 112 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 112 may be HDTV-capable. In some embodiments, display 112 may be a 3D display, and the interactive media guidance application and any suitable content may be displayed in 3D. A video card or graphics card may generate the output to the display 112. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 104. The video card may be integrated with the control circuitry 104. Speakers 114 may be provided as integrated with other elements of user equipment device 100 or may be stand-alone units. The audio component of videos and other content displayed on display 112 may be played through speakers 114. In some embodiments, the audio may be distributed to a receiver (not shown), which processes and outputs the audio via speakers 114.

User equipment device 100 may also incorporate or be accessible to detection module 116. For example, detection module 116 may identify particular users and/or the movements of the particular user. For example, via detection module 116, the media guidance application may determine when a user enters and/or exits a location and/or a viewing area associated with a media asset and/or a display device. Detection module 116 may also determine the trajectory of one or more users. Detection module 116 may further include various components (e.g., a video detection component, an audio detection component, etc.).

In some embodiments, detection module 116 may include a content recognition module to determine the content of a presented media asset (e.g., whether or not an advertisement, content of interest to a user, etc.) is being presented, the number of people in a viewing area, and/or a location. The content recognition module may use object recognition techniques such as edge detection, pattern recognition, including, but not limited to, self-learning systems (e.g., neural networks), optical character recognition, online character recognition (including but not limited to, dynamic character recognition, real-time character recognition, intelligent character recognition), and/or any other suitable technique. For example, the media guidance application may receive data in the form of a video. The video may include a series of frames. For each frame of the video, the media guidance application may use a content recognition module or algorithm to determine the people (including the actions associated with each of the people) in each of the frames or series of frames and/or where each identified person is looking. Alternatively or additionally, for each frame of the video, the media guidance application may use a content recognition module or algorithm to determine the content of one or more frames of a media asset. The media guidance application may then compare the determined content to user preference information (e.g., retrieved from a user profile).

In some embodiments, the content recognition module or algorithm may also include speech recognition techniques, including but not limited to Hidden Markov Models, dynamic time warping, and/or neural networks (as described above) to translate spoken words into text and/or processing audio data. The content recognition module may also combine multiple techniques to determine the content of a presented media asset (e.g., whether or not an advertisement, content of interest to a user, etc.) is being presented, the number of people in a viewing area, and/or the level of engagement of each person in the viewing area (e.g., whether or not a person is interacting with a device). For example, a video detection component of the detection module may generate data indicating that two people are within a viewing area of a user device. An audio component of the detection module may generate data indicating that the two people are currently engaged in a conversation about the media assets (e.g., by determining and processing keywords in the conversation).

In addition, the media guidance application may use multiple types of optical character recognition and/or fuzzy logic, for example, when processing keyword(s) retrieved from data (e.g., textual data, translated audio data, user inputs, etc.) describing the engagement of a user (or when cross-referencing various types of data in databases). For example, if the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical. In some embodiments, the media guidance application may analyze particular received data of a data structure or media asset frame for particular values or text using optical character recognition methods described above in order to determine the engagement of a user. The data received could be associated with data describing the engagement of the user and/or any other data required for the function of the embodiments described herein. Furthermore, the data could contain values (e.g., the data could be expressed in binary or any other suitable code or programming language).

In some embodiments, detection module 116 may also detect other user actions and/or movements. For example, if the media guidance application determines that a user is currently accessing another media asset on a second device, the media guidance application may determine that the user is not viewing a media asset on a first device despite being within a viewing area. However, if the content on the second device is similar (e.g., relates to the same subject matter, product, genre, etc.) to the content associated with the first device, the media guidance application may determine that the user is viewing the media asset on the first device.

Alternatively or additionally, detection module 116 may determine (e.g., via querying a device, object recognition, etc.) whether or not is interacting with a device. For example, if the user does not interact with a device for a threshold time period (e.g., a period of time representative of a user no longer interacting with a device), the media guidance application may determine that the user has stopped consuming a media asset on the device (or location associated with that device). Alternatively or additionally, detection module 116 may determine (e.g., via querying a device, object recognition, etc.) whether or not is a threshold distance from a device. For example, if the user is a threshold distance (e.g., a distance representative of a user no longer interacting with a device), the media guidance application may determine that the user has stopped consuming a media asset on the device (or location associated with that device). It should be noted that the "thresholds" described herein may be supplied by a user or may be automatically selected, or otherwise may be determined based on availability of network connection or for purposes of data transfer, for example. Automatically selected thresholds may have a default setting (e.g., determined by a third party) that may be updated based on a user's history. For example, the actual thresholds may be tailored to a particular user (e.g., a user that typically stands further away from a device when using the device may has a higher threshold distance than a user that stands closer to the device when using the device).

The media guidance application (e.g., via detection module 116) may also verify a user interest through other means. For example, the media guidance application, using a detection module (e.g., detection module 116 (FIG. 1)), may query the search history associated with a search engine accessed from a second device (e.g., a smartphone or tablet computer) being used by a user within the viewing area of the display device associated with the media guidance application. Upon detecting that the user previously searched for information similar to the information currently presented by the user device, the media guidance application may determine that the user in viewing the media asset.

In another example, the media guidance application, using a detection module (e.g., detection module 116 (FIG. 1)), may analyze keywords within a conversation between users occurring within the viewing area of a display device. If any of the keywords describe an interest in the content presented on the user device (e.g., as determined by a cross-reference with a database indicating words indicative of an interest in the content), the media guidance application may determine that the user is viewing the media asset.

The media guidance application may also receive (e.g., via detection module 116 (FIG. 1)) user-generated data (e.g., status updates, microblog posts, etc.) describing a media asset and/or advertisement generated for display by the media guidance application. For example, if a user posts an update to a social media website that he/she is currently enjoying a media asset, the media guidance application may determine the user is viewing the media asset. Likewise, if a user posts an update to a social media website that he/she is currently going home, the media guidance application may determine the trajectory of the user based on the user's home location.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

The guidance application may be implemented using any suitable architecture. For example, it may be a stand-alone application wholly-implemented on user equipment device 100. In such an approach, instructions of the application are stored locally (e.g., in storage 108), and data for use by the application is downloaded on a periodic basis (e.g., from an out-of-band feed, from an Internet resource, or using another suitable approach). Control circuitry 104 may retrieve instructions of the application from storage 108 and process the instructions to generate any of the displays discussed herein. Based on the processed instructions, control circuitry 104 may determine what action to perform when input is received from input interface 110. For example, movement of a cursor on a display up/down may be indicated by the processed instructions when input interface 110 indicates that an up/down button was selected.

In some embodiments, the media guidance application is a client-server based application. Data for use by a thick or thin client implemented on user equipment device 100 is retrieved on-demand by issuing requests to a server remote to the user equipment device 100. In one example of a client-server based guidance application, control circuitry 104 runs a web browser that interprets web pages provided by a remote server. For example, the remote server may store the instructions for the application in a storage device. The remote server may process the stored instructions using circuitry (e.g., control circuitry 104) and generate the displays discussed above and below. The client device may receive the displays generated by the remote server and may display the content of the displays locally on equipment device 100. This way, the processing of the instructions is performed remotely by the server while the resulting displays are provided locally on equipment device 100. Equipment device 100 may receive inputs from the user via input interface 110 and transmit those inputs to the remote server for processing and generating the corresponding displays. For example, equipment device 100 may transmit a communication to the remote server indicating that an up/down button was selected via input interface 110. The remote server may process instructions in accordance with that input and generate a display of the application corresponding to the input (e.g., a display that moves a cursor up/down). The generated display is then transmitted to equipment device 100 for presentation to the user.

In some embodiments, the media guidance application is downloaded and interpreted or otherwise run by an interpreter or virtual machine (run by control circuitry 104). In some embodiments, the guidance application may be encoded in the ETV Binary Interchange Format (EBIF), received by control circuitry 104 as part of a suitable feed, and interpreted by a user agent running on control circuitry 104. For example, the guidance application may be an EBIF application. In some embodiments, the guidance application may be defined by a series of JAVA-based files that are received and run by a local virtual machine or other suitable middleware executed by control circuitry 104. In some of such embodiments (e.g., those employing MPEG-2 or other digital media encoding schemes), the guidance application may be, for example, encoded and transmitted in an MPEG-2 object carousel with the MPEG audio and video packets of a program.

Figure 2:
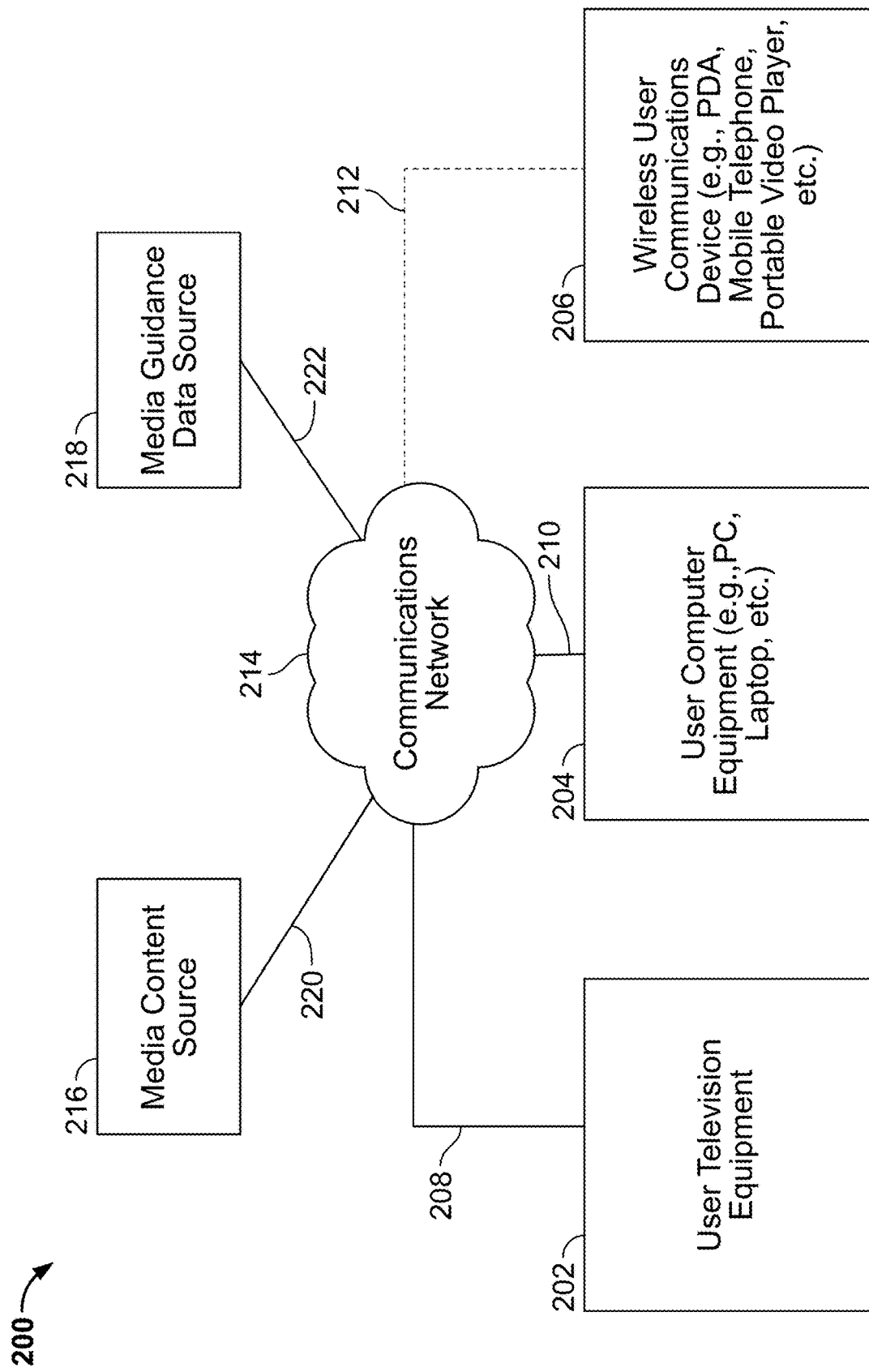
FIG. 2 is a block diagram of an illustrative process for media session continuation based on receiving a transfer request, in accordance with some embodiments of the disclosure.

User equipment device 100 of FIG. 1 can be implemented in system 200 of FIG. 2 as user television equipment 202, user computer equipment 204, wireless user communications device 206, or any other type of user equipment suitable for accessing content, such as a nonportable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 1 may not be classified solely as user television equipment 202, user computer equipment 204, or a wireless user communications device 206. For example, user television equipment 202 may, like some user computer equipment 204, be Internet-enabled allowing for access to Internet content, while user computer equipment 204 may, like some television equipment 202, include a tuner allowing for access to television programming. The media guidance application may have the same layout on various different types of user equipment or may be tailored to the display capabilities of the user equipment. For example, on user computer equipment 204, the guidance application may be provided as a web site accessed by a web browser. In another example, the guidance application may be scaled down for wireless user communications devices 206.

In system 200, there is typically more than one of each type of user equipment device but only one of each is shown in FIG. 2 to avoid overcomplicating the drawing. In addition, each user may utilize more than one type of user equipment device and also more than one of each type of user equipment device. In some embodiments, a user equipment device (e.g., user television equipment 202, user computer equipment 204, wireless user communications device 206) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

In example embodiments, each user may utilize or may authenticated access to more than one type of user equipment device and also more than one of each type of user equipment device. In example embodiments, a user equipment device (e.g., user television equipment 202, user computer equipment 204, wireless user communications device 206) may alternatively be referred to as a "second device". The second device 406 being the user device on which a media asset is sought to be continued.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 214. Namely, user television equipment 202, user computer equipment 204, and wireless user communications device 206 are coupled to communications network 214 via communications paths 208, 210, and 212, respectively. Communications network 214 may be one or more networks including the Internet, a mobile phone network, mobile voice or data network (e.g., a 4G or LTE network), cable network, public switched telephone network, or other types of communications network or combinations of communications networks. Paths 208, 210, and 212 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 212 is drawn with dotted lines to indicate that in the exemplary embodiment shown in FIG. 2 it is a wireless path and paths 208 and 210 are drawn as solid lines to indicate they are wired paths (although these paths may be wireless paths, if desired). Communications with the user equipment devices may be provided by one or more of these communications paths, but are shown as a single path in FIG. 2 to avoid overcomplicating the drawing.

Although communications paths are not drawn between user equipment devices, these devices may communicate directly with each other via communication paths, such as those described above in connection with paths 208, 210, and 212, as well as other short-range point-to-point communication paths, such as USB cables, IEEE 1394 cables, wireless paths (e.g., Bluetooth, infrared, IEEE 702-11x, etc.), or other short-range communication via wired or wireless paths. BLUETOOTH is a certification mark owned by Bluetooth SIG, INC. The user equipment devices may also communicate with each other directly through an indirect path via communications network 214.

System 200 includes content source 216 and media guidance data source 218 coupled to communications network 214 via communication paths 220 and 222, respectively. Paths 220 and 222 may include any of the communication paths described above in connection with paths 208, 210, and 212. Communications with the content source 216 and media guidance data source 218 may be exchanged over one or more communications paths, but are shown as a single path in FIG. 2 to avoid overcomplicating the drawing. In addition, there may be more than one of each of content source 216 and media guidance data source 218, but only one of each is shown in FIG. 2 to avoid overcomplicating the drawing. (The different types of each of these sources are discussed below.) If desired, content source 216 and media guidance data source 218 may be integrated as one source device. Although communications between sources 216 and 218 with user equipment devices 202, 204, and 206 are shown as through communications network 214, in some embodiments, sources 216 and 218 may communicate directly with user equipment devices 202, 204, and 206 via communication paths (not shown) such as those described above in connection with paths 208, 210, and 212.

Content source 216 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 216 may be the originator of content (e.g., a television broadcaster, a Webcast provider, etc.) or may not be the originator of content (e.g., an on-demand content provider, an Internet provider of content of broadcast programs for downloading, etc.). Content source 216 may include cable sources, satellite providers, on-demand providers, Internet providers, over-the-top content providers, or other providers of content. Content source 216 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 218 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 218 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 218 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 218 may provide user equipment devices 202, 204, and 206 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year.

Media guidance applications may be, for example, stand-alone applications implemented on user equipment devices. For example, the media guidance application may be implemented as software or a set of executable instructions which may be stored in storage 108, and executed by control circuitry 104 of a user equipment device 100. In some embodiments, media guidance applications may be client-server applications where only a client application resides on the user equipment device, and server application resides on a remote server. For example, media guidance applications may be implemented partially as a client application on control circuitry 104 of user equipment device 100 and partially on a remote server as a server application (e.g., media guidance data source 218) running on control circuitry of the remote server. When executed by control circuitry of the remote server (such as media guidance data source 218), the media guidance application may instruct the control circuitry to generate the guidance application displays and transmit the generated displays to the user equipment devices. The server application may instruct the control circuitry of the media guidance data source 218 to transmit data for storage on the user equipment. The client application may instruct control circuitry of the receiving user equipment to generate the guidance application displays.

Content and/or media guidance data delivered to user equipment devices 202, 204, and 206 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 200 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 2.

In one approach, user equipment devices may communicate with each other within a home network. User equipment devices can communicate with each other directly via short-range point-to-point communication schemes described above, via indirect paths through a hub or other similar device provided on a home network, or via communications network 214. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,210, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 216 to access content. Specifically, within a home, users of user television equipment 202 and user computer equipment 204 may access the media guidance application to navigate among and locate desirable content. Users may also access the media guidance application outside of the home using wireless user communications devices 206 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 214. These cloud resources may include one or more content sources 216 and one or more media guidance data sources 218. In addition or in the alternative, the remote computing sites may include other user equipment devices, such as user television equipment 202, user computer equipment 204, and wireless user communications device 206. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 1.

Media systems often utilize a local buffer where portions of a received media asset are stored before being displayed. Such buffers commonly have a fixed size; however it will be appreciated that the buffers may vary in size depending on various aspects related to the present disclosure. For example, the buffer size may be increased when it is acknowledged that the user rewinds the media assets too far and the desired portion of the media asset may no longer be contained in the initial buffer. In such cases, the media system may make a new request for the remote device to provide the needed portion. Additionally, in some systems it is not desirable to maintain a large buffer at all times. Large buffers consume limited random-access memory available to the media system and may degrade overall performance of the media system due to unavailability of memory for other tasks.

In some embodiments, the media system or user device buffers a first segment of a media asset received from a remote device. For example, a video player executing in an Internet browser of a smartphone may buffer a first segment (e.g., a first scene of a movie), otherwise described herein as a buffered segment or buffered portion, streamed from an online video service. The buffer may have a default size (e.g., buffer may have enough data to buffer one minute of the media asset). In some implementations, the buffer may have a size corresponding to size of the media asset, for example. For example, the buffered segments may vary from 50 megabytes ("MB") (e.g., approximately one minute of video) to 250 MB (e.g., approximately five minutes of video), although this can be decreased and/or increased depending on the length of the media asset for example. The size, length, starting points, or markers associated with the buffered portion will be further described below in the context of example embodiments herein.

Figure 4:
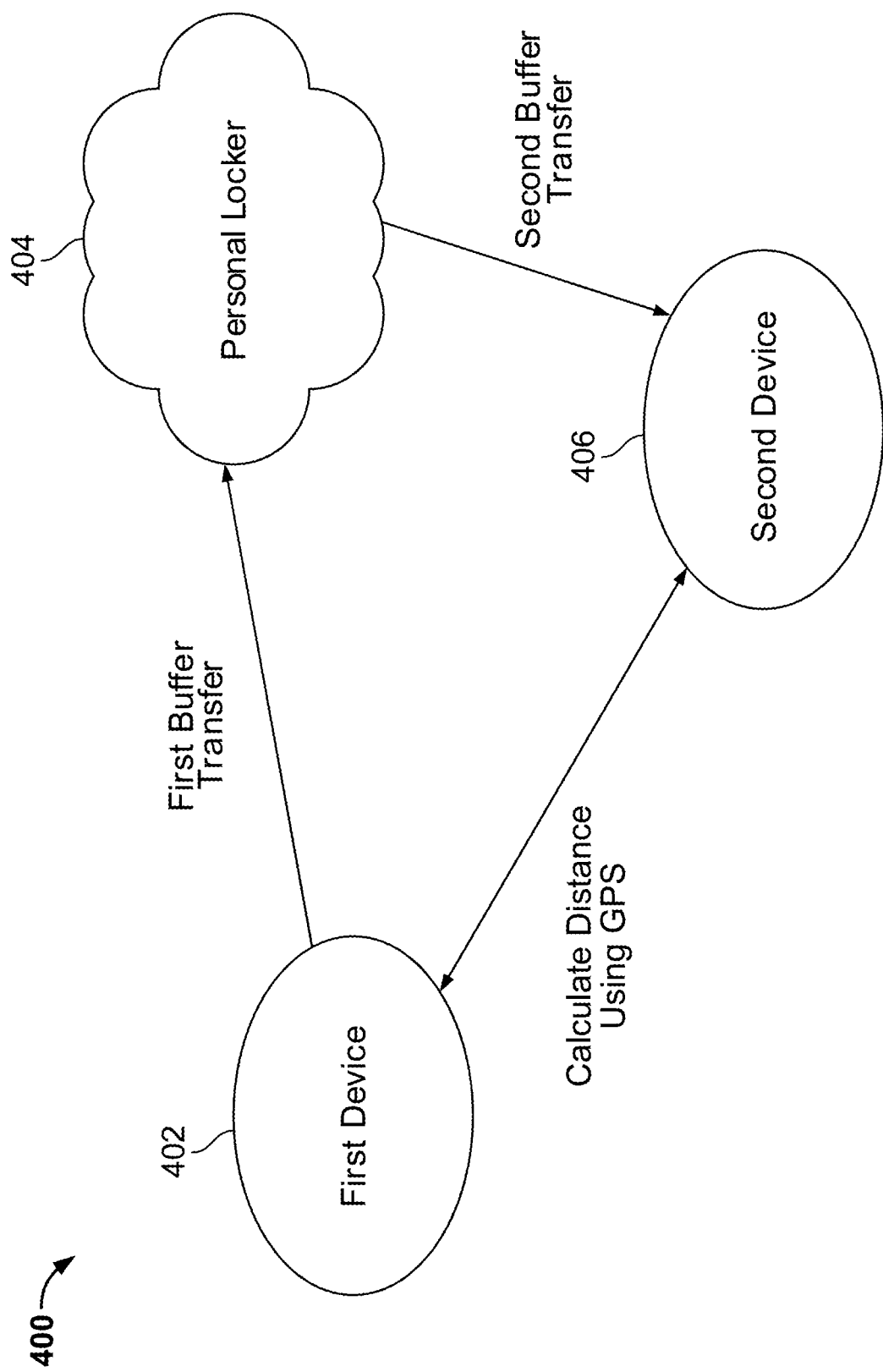
FIGS. 4-5 are illustrations depicting an example method of media content continuation and the process of the present invention, in accordance with some embodiments of the disclosure.

In example embodiments, and in FIG. 4, GPS measurements of the first and second user devices, 402 and 406, and the calculated distance between said devices are used as a major concept in example embodiments described herein. For example, using GPS, the system can identify the position of the first user device 402 and determine its trajectory.

By calculating and monitoring the distance between first and second devices, 402 and 406, and if the distance between the two devices is below or within a first threshold and the direction of movement of the first device 402 is towards the second device 406, the first device 402 can transfer media content that is already buffered to a user's personal locker 404 located on the Internet, or in the cloud. In example embodiments, it may be assumed that the distance between the two devices is smaller than a first threshold. In other words, it may be assumed that both user devices are under the purview of the same Internet exchange center of an Internet service provider. In some embodiments, the second device 406 may start establishing its own connection with the source of the content (e.g., YouTube) for a further seamless media session continuation for the user.

As used herein, "location" refers to any relative or absolute identifier of a position of a user or user device. For example, the location of the user or user device may be relative to a geographical coordinate, vector for direction, street address, name of building, or any other suitable identifier. In another example, the location may be relative to a property type (e.g., restaurant, hardware store, movie theatre, post office, personal residence, place of business, etc.). As referred to herein, a "property type" refers to a location associated with a specific purpose, or function of the user. For example, a first property type may be the home of the user. Furthermore, the media content available at the first property type may be capable of generating media content available at the user's second property type. For example, the user may subscribe to a cable provider or OTT content provider that can be ubiquitous at the user's first and second property types, or other property types. Thus, the media content available to the user at the residence of the user may be the same as the media content available to the user at the user's car or office, for example.

In some embodiments, the location may also refer to a coverage area. For example, the location may refer to a particular entity that governs, administers, controls, and/or provides network coverage for the location. For example, the media guidance application may determine that a first location may be associated with a first wireless network (e.g., a home network of the user) and that a second location may be associated with a second wireless network (e.g., an office network of the user). Moreover, a first location may refer to a geographic area with a first level of coverage (e.g., a first quality of service) and a second location may refer to a geographic area with a second level of coverage (e.g., a second quality of service). For example, while, in some embodiments, a location may be indicated by coordinates in a geographic coordinate system (e.g., latitude or longitude), or a global positioning system (GPS), in some embodiments, additionally or alternatively, a location may be determined by other information such as the property type, network coverage, and/or the amount, type, or accessibility of media content at the location.

In some embodiments, a location may be associated with one or more user devices, content providers, quality of service, etc. Such information may be stored in a database either local to or remote from the media guidance application. Furthermore, the database may be populated with information from a service provider, content provider, a user, and/or any third party. Additionally or alternatively, the media guidance application may query one or more devices to determine particular locations associated with the device. For example, each device may retrieve an associated location (or determine an associated location) based on GPS coordinates. A location may further be determined for one or more devices encompassing a viewing area associated with each device.

In some embodiments, user devices, upon which the media guidance application or applications are implemented, may use GPS data (e.g., received from a GPS device incorporated into or accessible by the media guidance application that identifies the current geographic coordinates), object recognition data (e.g., received from an object recognition module incorporated into or accessible by the media guidance application that identifies an object associated with a particular location), or other data to determine the current location of the user.

As used herein, a "trajectory" of a user refers to a direction that a user is moving through space according to detected components. As used herein, a "component" of the trajectory refers to any characteristic of a user interaction that may affect the trajectory. For example, components may include the speed or velocity, the direction or angle, and/or any other measurement that may affect the trajectory. The trajectory may be expressed in any suitable units and is typically described in reference to a starting point. In some embodiments, the starting point is a first location or a location of a first device 402. The media guidance application may use the first location (or location of the first device) as described in suitable coordinates (e.g., global positioning coordinates) to determine where the trajectory of the user is likely to lead the user and to identify or select a second device 406 at which the media asset is to be continued, for example.

In some embodiments, a trajectory may also include a mode of transportation. For example, the media guidance application may determine whether the user is walking or driving a car to determine a location that the user may go or is going, i.e., to determine the user's trajectory. In such cases, information about the mode of transportation may be used by the media guidance application. For example, locations of train stations (e.g., if the user is moving via a train) may be used by the media guidance application to determine the user's trajectory.

Figure 3:
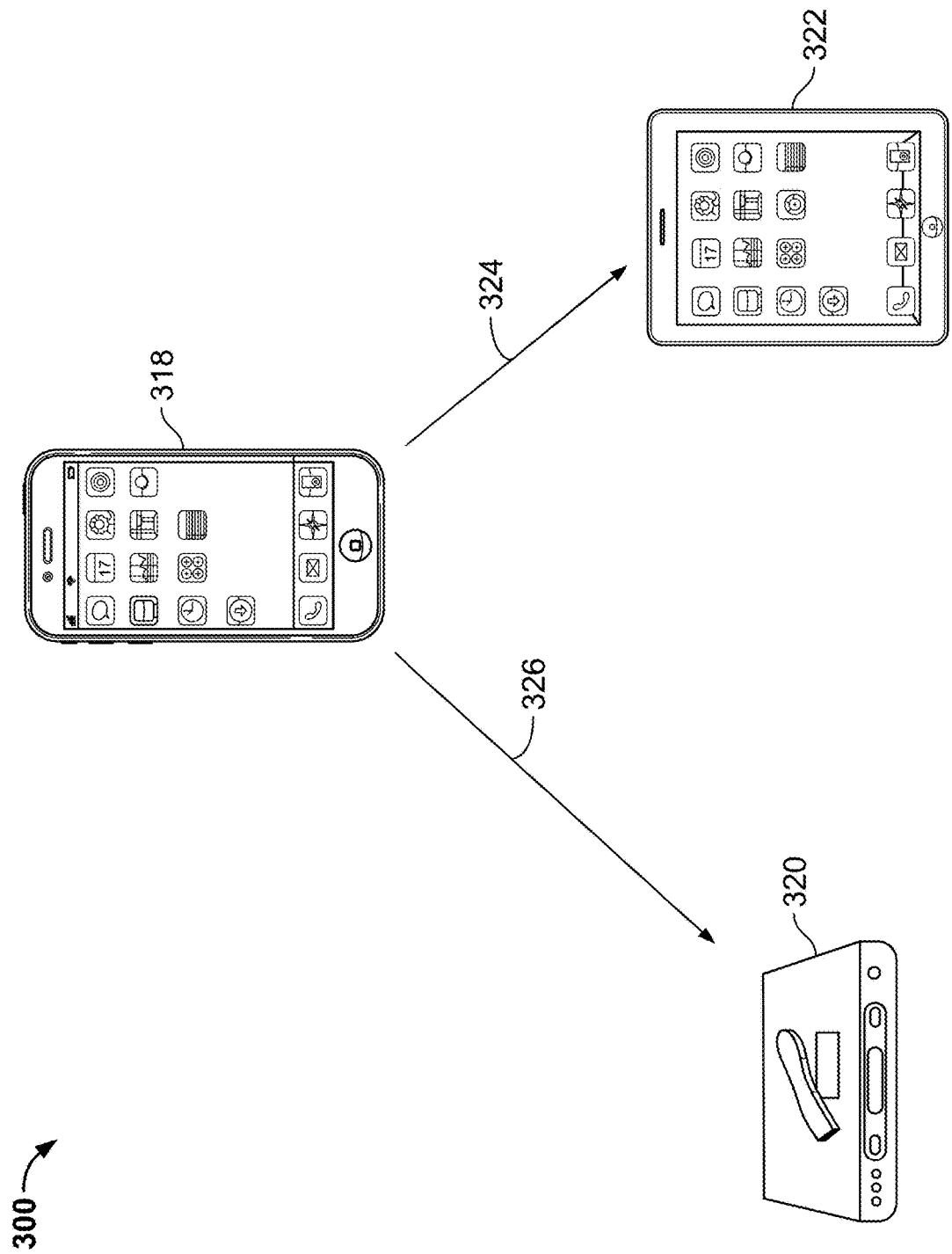
FIG. 3 shows an illustrative embodiment of user devices and user trajectories, in accordance with some embodiments of the disclosure.

A display arrangement for providing media guidance is shown in FIG. 3. As shown in FIG. 3, device 318 may correspond to a first location, or a device at a first location, whereas device 320 may correspond to a device in a second location, and device 322 may correspond to a device in a third location. Furthermore, a media asset accessed on device 318 may be determined to be displayed on device 320 or 322 as described below, identifiable or selectable based on the user's trajectory or location, for example. Furthermore, device 320 may be reached via trajectory 326, whereas device 322 may be reached via trajectory 324. In some embodiments, the media guidance application may determine which device (e.g., device 320 or 322) or which location (e.g., associated with either device 320 or device 322) a user is approaching based on determining that the user is following a determined trajectory (e.g., trajectory 326 or 324).

When determining a trajectory, the media guidance application may determine a first location corresponding to a first device 402, first location, first viewing area, etc. and a second location corresponding to a second device 406, second location, second viewing area, etc. associated with coordinates (e.g., GPS coordinates). The media guidance application may then determine a distance between the first and second user devices, 402 and 406, based on known first and second locations. It may be determined that the trajectory is a directional pose of the user.

In some embodiments, the media guidance application may also determine a location of the user. For example, the media guidance application may detect a user using updated GPS coordinates, object recognition, social media posts, and/or any other technique (e.g., as discussed below in relation to FIG. 1). The media guidance application may then compare the first location to the current location or the location of the second device 406 to determine the user's trajectory, for example. For example, the media guidance application may determine a difference between two sets of coordinates to determine a directional pose of the user.

The media guidance application may catalogue the device use to determine whether a user is interacting with the first device 402. For example, every time the media guidance application detects a user input into the first device 402, such as a smartphone, the media guidance application may start a timer to keep track of the amount of time passed since a user input. When the timer reaches a threshold number, the media guidance application may determine that the user has stopped using the first user device 402. The media guidance application may also start monitoring other devices for user input. For example, once user input is detected on another device, such as the second user device 406, the media guidance application may determine that the user is interacting with and using the second device 406. However, in example embodiments, user input may be detected on the first user device 402 to indicate that the user wishes to continue streaming media content, for example, on the second device 406. The form of detection may be based on manual user input on the first user device 402 or, alternatively or in combination, the detection may be automated based on user preferences, user profile and/or previous detections.

In some aspects, the media guidance application implemented on control circuitry may determine that a user has stopped consuming the media asset on the first device 402, or at a first location. For example, the media guidance application may determine that the user has stopped consuming the first media asset on the first device 402, or at the first location, by detecting that the user has moved from the first location corresponding to the first device 402 to a second location corresponding to any of a location away from the first device 402 (e.g., the user has left a viewing area corresponding to the first device 402), a location of the second user device 406 or a predetermined distance from the first location. Additionally or alternatively, the media guidance application may determine that the user has stopped consuming the first media asset on the first device 402 or at the first location by detecting that the user has stopped interacting with the first device 402 (e.g., the user has not used the first device for a threshold period of time).

The media guidance application may determine a trajectory of the user in response to determining that the user has stopped consuming the first media asset on the first device 402. For example, the media guidance application may determine the trajectory by determining a first location corresponding to the first device 402, determining a current location of the user, and comparing the first location to the current location. Alternatively, the trajectory may be determined based on a navigation system embedded within the first user device 402, for example, or based on a user input of a target location. For example, by determining the difference between the current location of the user and the initial location of the user, the media guidance application may determine a directional pose of the user.

In example embodiments, the media guidance application may determine one or more media devices available to the user and identify and/or select one of the one or more of media devices as the second device 406 for which to continue streaming the media content initially being consumed at the first user device 402. For example, it may be acknowledged that the media assets available on the second device 406 may be the same as the media assets available to the user on the first device 402 or that the second device 406 is connectable to the same content source, content provider (e.g., OTT provider) through the user's profile or same internet provider. In some cases, for example, the media asset may already be downloaded by the user and be readily available to the user on the go. In a further example, the media guidance application may identify the second device 406 by determining a media device corresponding to the trajectory of the user.

Alternatively, the media guidance application may identify, using the control circuitry, a plurality of available locations (e.g., which may each correspond to a different device) for the user to consume media content based on the trajectory. For example, the media guidance application may identify the second location of the plurality of available locations where the user will consume media content based on the trajectory, by inputting the trajectory into a database listing locations associated with different trajectories from the first location, searching the database, and receiving an output of the second location in response to searching the database. Based on the identified second location, a corresponding user device, i.e., the second user device 406 can be determined, for example. For example, the media guidance application may store a second location corresponding to the second device 406 in memory.

In a further example, the media guidance application may store a list of devices corresponding to the user, for example user devices that the user has already provided user authentication for, and the various locations of those devices. Furthermore, the media guidance application may identify what locations, if any, correspond to a current trajectory from the first device 402. The media guidance application may then retrieve the second location of the second device from the memory. The media guidance application may then determine that the second location corresponds to the trajectory.

In some embodiments, the media guidance application may generate an alert that indicates to the user that the media asset is available on the identified or selected second device 406. An "alert," as defined herein, may be any communication to a user that apprises the user of one or more occurrences. For example, the alert may alert the user of the availability of media content recommendations that are based on content recently consumed by the user on a different device. It should be noted that the alert may include audio, video, and/or text-based alerts.

In some embodiments, the media guidance application may, in response to determining that the user has stopped using the first device 402 and wishes to continue watching the media asset at the second device 406, retrieve a threshold length of time from memory otherwise known as the buffered portion transferred from the first device 402 via a personal locker 404. As referred to herein, a "buffered portion" is a length of time used to indicate a portion or segment of a media content recently consumed by a user on the first user device 402 that has already been buffered. For example, the buffered portion may begin at a point in time, otherwise described as a marker, when a user starts consuming media content on the first device 402. Alternatively, the buffered portion may begin at a point in time (i.e., the marker) where the user stops consuming media content on the first device 402 and extend forwards through time to a point in time for which the media content can continue playing without or with a lack of connection to the media source. Further alternatively, in some embodiments for example, the buffered portion may extend backwards through time to a point in time during which a user was consuming media content on a first device 402, which may be suitable for media content playback. The media guidance application may determine media content consumed by the user from the point in time during which the user was consuming media content on the first device 402 to a point in time at which the user stopped consuming media content on the first device 402.

Figure 6:
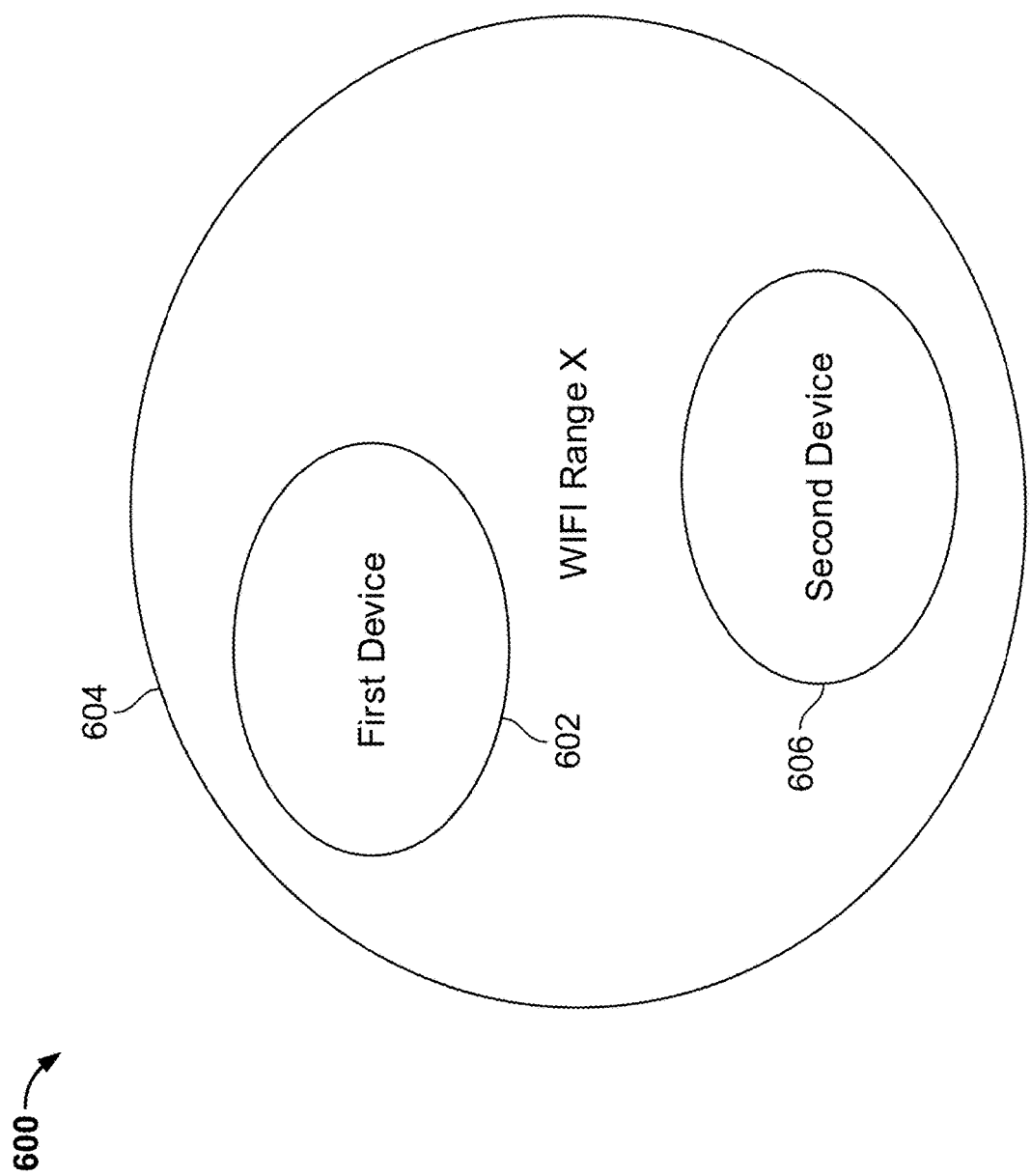
FIG. 6 is an illustrative process for a method of providing continuity of availability of a media asset across devices when it is determined that the first device and the second device are within a same network range.

In example embodiments, as the media system acknowledges that the first device 402 and the second device 406 are within the Internet service provider's local exchange area, i.e., within the first threshold distance, the first user device 402 may transfer upon request or automatically a buffered portion of the media asset that was being consumed by the user at the first device 402 to the user's personal locker 404. In an alternative example as shown in FIG. 6, however, the first and second devices, 602 and 606, may be required to be connected to a network (e.g., a home network such as a Wi-Fi network 604) in order to initiate the buffer transfer process from the first device 602 to the personal locker 404.

In example embodiments, the buffered portion of the media asset that was being consumed by the user at the first device 402, now temporarily stored at the user's personal locker 404 located within the internet service provider's local exchange area, can be transferred farther to the user's second device 406. In example embodiments, a second threshold distance can be associated with when it is possible to or would be ideal to begin the second buffer transfer request from the user's personal locker 404 to the second device 406. For example, to determine whether or not a user device is within the second threshold distance corresponding to the user devices, the media guidance application may base its determination on data received from a global positioning system (e.g., indicating that the user is within a particular geographical boundary and/or distance). In yet another example, in order to determine whether or not a user is within a predetermined proximity or viewing area of the second user device 406, the media guidance application may base its determination on whether or not a user input is received indicating that the user is within, at or soon to be at the second threshold distance from the second user device 406. The second threshold distance, for example, can be determined to accommodate turning on of the second user device or loading of the buffered portion transferred to the second device 406.

In example embodiments, the control circuitry 204 may determine that a buffer transfer request is likely. As referred to herein, a "likelihood" relates to any measure of a future user buffer transfer request occurring for the segment. For example, in some embodiments discussed below, a likelihood of the user requesting a buffer transfer may be a ratio between a number of times a user previously requested buffer transfer when stopping a media asset on one device and a number times the user manually began to watch the media asset on a second device 406, or the media system may determine the likelihood based on a manual transfer request of the segment by the user. As referred to herein, the term "likely" refers to a determination of whether the likelihood measure meets or exceeds an electronically stored predefined condition. For example, the media system may determine that a buffer transfer request is likely when the ratio described above exceeds a predefined value, such as 0.5.

In another example, the media system may determine that a buffer transfer request is likely when the user reaches a certain or pre-set locations such as the user's home, office or car, for example. When the system determines that a buffer transfer is likely, the buffered segment of the media asset is acknowledged and transferred to a second media device via a user's personal locker 404. When the segment concludes, the size of the buffer is reduced back to the original size. In this way, whenever a buffer transfer request is received, the second media device 406 can retrieve the needed portion of the media asset for instant or substantially instant generation, thus avoiding the need for an inefficient and slow request to or connection with the source provider of the media asset.

In some embodiments, the control circuitry may retrieve metadata associated with a segment of a media asset and compare the metadata associated with the segment to a profile of a user to determine whether receiving a buffer transfer request is likely while displaying the segment. For example, when the metadata indicates that the segment contains content that is of interest to the user, a buffer transfer request may be more likely because a user may wish to re-watch or rewind the content segment of the media asset to watch the segment of interest again at the user's second device 406. It will be appreciated that metadata may include any information relating to a media asset such as media-related information (e.g., titles, descriptions, ratings information (e.g., parental control ratings, critic's ratings, etc.), genre or category information, actor information, etc.), media format/stream settings (e.g., resolution, frame rate, bitrate etc.), or other type of data that indicates content or attributes of at least a portion of a media asset.

The media system can retrieve metadata associated with consumed media assets and previous transfer requests. The metadata may contain information about the buffered segment of the media asset such as the genre of the segment, complexity of the segment, language or accent of characters in the segment, and audio level of the segment. Additionally, the media system may receive historical data about buffer transfer requests received by other systems when playing that segment or similar segments for other users. Further additionally, the media system may receive historical data about buffer transfer requests received by other systems when logging into or assigned to the user's profile.

In some embodiments, the media system may also retrieve a profile of the user who is currently watching the media asset. In some embodiments, the media system uses preferences in the profile, such as preferred genres and preferred languages, to determine whether the user will likely request a buffer transfer when reaching a particular location, i.e., a second location corresponding to a second device 406. In some embodiments, the media system may take into account stored lifestyle preferences or lifestyle patterns of the user or predicted user actions. For example, such user data may take into account the user's lifestyle pattern on working and non-working days, estimated travel times, or estimated time of interruption before the user typically decides to begin interacting with the second device 406 after having already arrived home. However, the media guidance application and media systems can factor in vast amounts of user metadata in order to determine whether a buffer transfer request is likely or whether the user wishes to continue watching a media asset on a second device 406. For example, the media system may determine that the user is likely to or wishes to issue a buffer transfer request, manually, semi-automatically or automatically, as soon as the user reaches home or several minutes thereafter or beforehand, for example. The media system may also retrieve historical data in relation to previous buffer transfer requests or detections received from the same user while that user consumed similar or other media content. In some embodiments, the media system may also retrieve historical data in relation to previous buffer transfer requests or detections received from the same user while the user travelled along a similar trajectory or commuted from a particular first location to the second location where the second device 406 is located.

For example, just prior to a user leaving her home, the user may be watching "Game of Thrones" on the user's first device 402. When the user leaves her home, the media guidance application may determine that the user is likely to be going to her car, based on previous lifestyle patterns, or through user input, or based on the user's location or movement. Based on user preferences, for example, the buffered portion of "Game of Thrones," starting from where the user stopped consuming the show on the first device 402, can be continued on the user's integrated car media system or smartphone, for example.

By way of disclosure, the various embodiments described herein can provide a user with seamless continuation of media content with substantially minimal interruption time between providing that content on the user's first device 402 and continuing the content on the user's second device 406.

In some embodiments, a user may move from one location being within the viewing area of the first device 402 to a second location being within the viewing area of the second device 406. For example, the media asset may be generated based on a user's estimated time of arrival at the second device 406 or, more particularly, the ETA of the user at the viewing area of the second device.

In some embodiments, for example, the vehicle speed, remaining distance and/or level of traffic can be used to calculate or determine the ETA of the user at the location of the second device 406. Therefore, a further parameter may be negotiated between the first and second device, 402 and 406, based on the user's ETA. This new parameter is the segment "X" of the media asset or the buffered portion that the second device 406 can start to stream directly from the source. The second device 406 starting to stream an earlier segment of the media asset may be incorrect since the user would not have reached home by then and hence there would be a waste of bandwidth. However, starting with a later segment of the media asset may also be incorrect since the expectation is that the second device 406 show specific segments once the user reaches the viewing area of the second device 406, for example. When this segment "X" is negotiated, then the first device 402 can avoid buffering any segment that comes after "X", for example.

Figure 5:
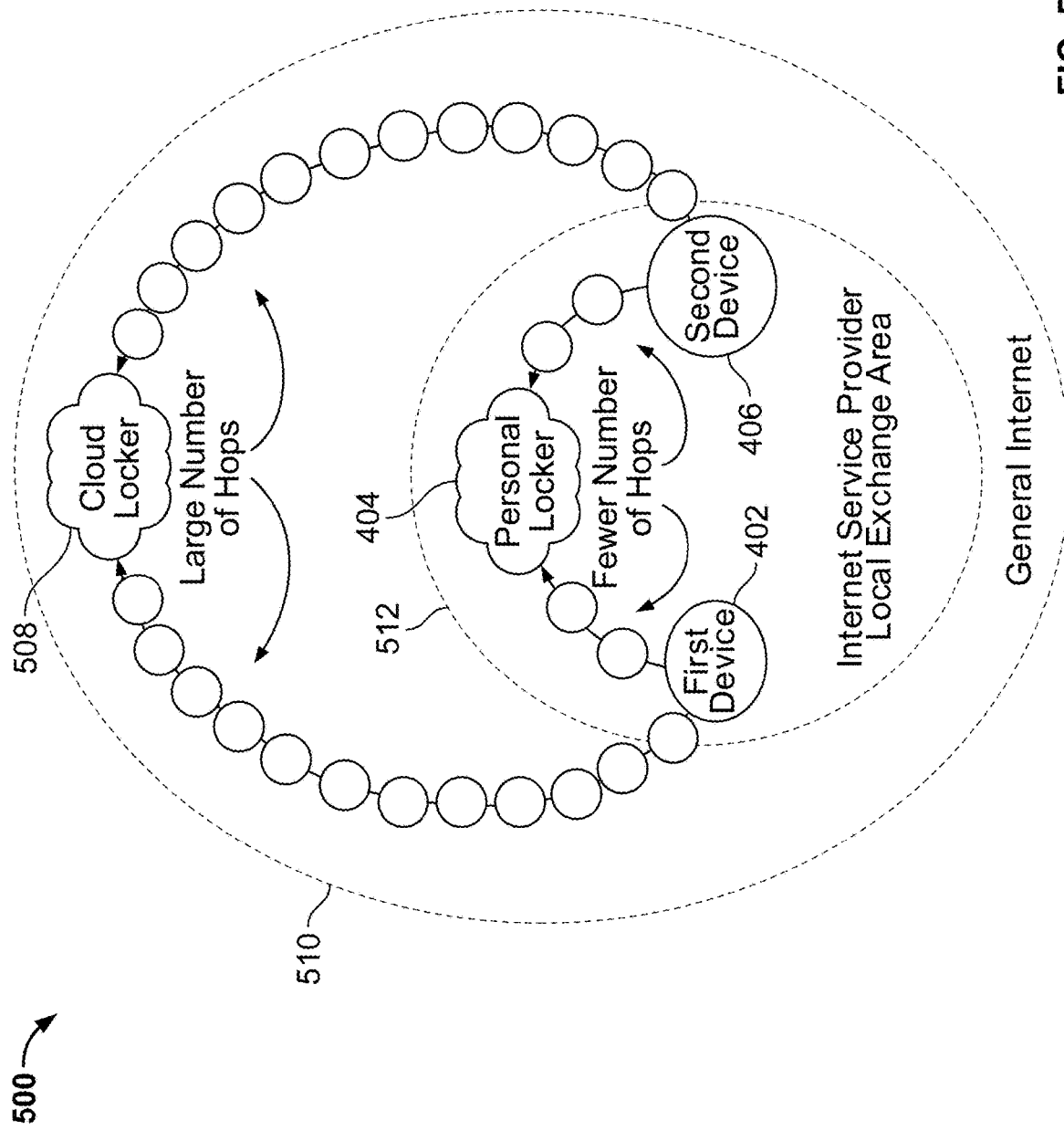

In example embodiments, as shown in FIG. 5, using a personal locker 404 at the local Internet Exchange center level can provide benefits such as reduced number of hops and hence latency as shown in the illustrative diagram 500. For example, all OTT service providers, even when using a Content delivery network or the cloud network or cloud locker 508, over the general internet 510 have more hops between the OTT data centers and the user devices compared to the internet exchange data center 512. Furthermore, if the personal locker 404 is in a cloud service that is not cognizant of the geographical locations of the two devices, then the exchange of the buffer may be inefficient. Thus, the present application can be particularly effective and efficient when using the local Internet exchange center as temporary (or tertiary) storage.

Further benefits include, but are not limited to, minimized manual intervention in providing authentication to store and retrieve buffered content, for example, and minimized bandwidth usage as the buffered content can be temporarily stored within the local area storage described as the user's personal locker 404. Additionally, using the personal locker 404 method of storing buffered content can be very cost-efficient since OTT sources, for example, may have a cap on bandwidth utilization, such as for downloading 8k media content. Downloading the already buffered content again separately from the second device 406 will consume this bandwidth cap unnecessarily, especially when it comes to high-resolution media content such as 1080p, 4k or 8k content.

By way of example embodiments described herein, the second user device 406 can gain easy access to buffered content that was created at the first device 402. Additionally, the second device 406 can be set up and ready to play the media asset that was being consumed by the user immediately, or substantially immediately, even without an established connection between the second device 406 and the media source, for example. In some embodiments, once the second device 406 establishes its own connection to the media source, it can begin streaming the content using the newly established connection directly from the source of the stream in order to continue the media content for a user-friendly experience.

In some embodiments, when the user is on their way home and the second device 406 at home starts to make its own connection to the source of the content, for example, there may be further negotiations between the first device 402 and the second device 406. For example, such negotiations include, but are not limited to, transcoding media asset data to correct video resolution size or video format for example. These negotiation steps can be applied prior to the first buffer transfer from the first device 402 to the personal locker 404 by way of transcoding the buffered content. Tailoring the media content to be suitable to the user experience on the second user device 406 can provide further efficiency since the format, resolution and encryption used can be at the preference of the second device 406. In some embodiments, there may be no user encryption since the content is temporarily stored in the user's personal locker 404 which can be accessed only by that particular user, and so the security of the user can be protected for media guidance applications described herein.

In some embodiments, the media guidance application may incorporate a detection module into or accessible by the media guidance application which can monitor the viewing area relating to the user devices to determine if and when a user is within or outside viewing area, for example. The media guidance application may employ numerous techniques for determining when a user enters or exits the viewing area of each user device in order to further determine whether the user has arrived at or is moving away from a particular device. The media guidance application may receive this information in numerous ways. For example, the media guidance application may receive a user input that indicates the current geographic coordinates, property type, network coverage, and/or media content available at a location. For example, upon arriving at a location the media guidance application may receive a user input of a name of the location.

Figure 7:
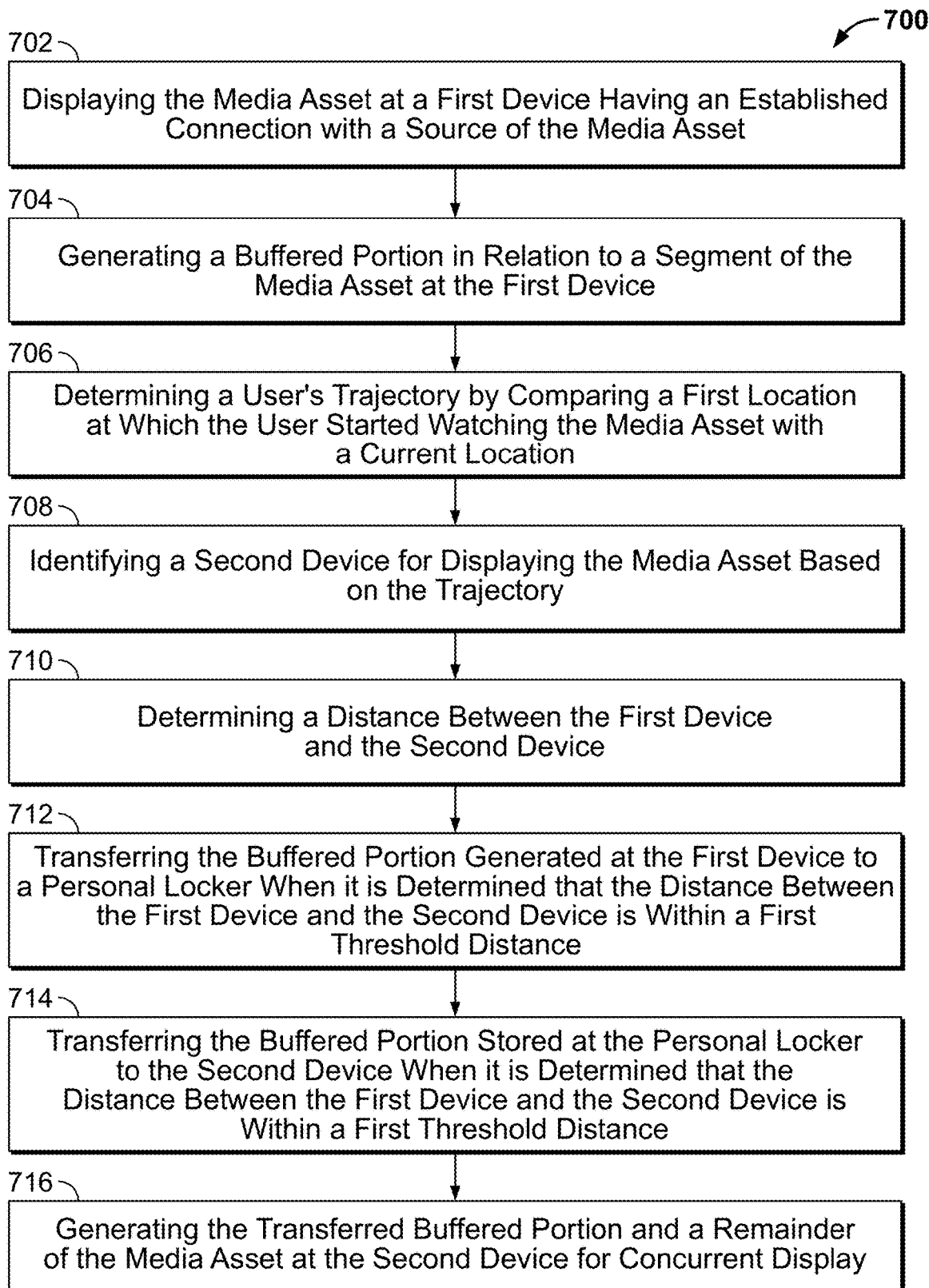
FIG. 7 shows a flowchart illustrating an example method of media content continuation and the process of the present invention, in accordance with some embodiments of the disclosure.

FIG. 7 is a flowchart of illustrative steps involved in continuing media asset sessions across media systems or media devices in a way designed to minimize substantial manual intervention. It should be noted that process 700 or any step thereof could be performed on, or provided by, any of the devices shown in FIGS. 1-2. For example, process 700 may be executed by control circuitry 104 (FIG. 1) as instructed by a media guidance application implemented on user equipment 202, 204, and/or 206 (FIG. 2) in order to identify content providers at a device selected based on the trajectory of a user. In addition, one or more steps of process 700 may be incorporated into or combined with one or more steps of any other process or embodiment.

At step 702, the media guidance application determines (e.g., via control circuitry 104 (FIG. 1)) a media asset to be displayed at a first device, the first device having an established connection with a source of the media asset. For example, the first device can have established its own connection with the source of the content such as YouTube.

At step 704, the media guidance application generates (e.g., via control circuitry 104 (FIG. 1)) a buffered portion in relation to a segment of the media asset at the first device. As referred to herein, a "buffered portion" is a length of time used to indicate a portion or segment of a media content, or content item, recently consumed by a user on the first user device 402 that has already been buffered. For example, the buffered portion may begin at a point in time, otherwise described as a marker, when a user starts consuming media content on the first device 402. Alternatively, the buffered portion may begin at a point in time (i.e., the marker) where the user stops consuming media content on the first device 402 and extend forwards through time to a point in time for which the media content can continue playing without or with a lack of connection to the media source.

At step 706, the media guidance application determines (e.g., via control circuitry 104 (FIG. 1)) a user's trajectory by comparing a first location at which the user started watching the media asset with a current location. When determining a trajectory, the media guidance application may determine a first location corresponding to a first device 402, first location, first viewing area, etc., and a second location corresponding to a second device 406, second location, second viewing area, etc., associated with coordinates (e.g., GPS coordinates). The media guidance application may then determine a distance between the first and second user devices, 402 and 406. It may be determined that the trajectory of the users' directional pose is directed towards the second device 406 and that the distance between the two devices is getting smaller.

At step 708, the media guidance application identifies (e.g., via control circuitry 104 (FIG. 1)) a second device 406 for displaying the media asset based on the trajectory. For example, the media guidance application may determine one or more media devices available to the user and identify or select one of the plurality of media devices as the second device 406 for which to continue streaming media content. It may be also acknowledged that the media assets available on the second device 406 may be the same as the media assets available to the user on the first device 402 or that the second device 406 is connectable to the same content source, or content provider, through the user's profile or same internet provider. For example, the media content may already be downloaded by the user. In a further example, the media guidance application may identify the second device 406 by determining a media device corresponding to the trajectory of the user.

At step 710, the media guidance application determines (e.g., via control circuitry 104 (FIG. 1)) a distance between the first device 402 and the second device 406. For example, using GPS, the system can identify the positions of the first user device 402 and the second user device 406.

At step 712, the media guidance application transfers (e.g., via control circuitry 104 (FIG. 1)) the buffered portion generated at the first device 402 to a personal locker 404 when it is determined that the distance between the first device 402 and the second device 406 is within a first threshold distance. For example, by calculating or monitoring the distance between first and second devices, 402 and 406, and if the distance between the two devices falls below, or is within, a first threshold, i.e., the direction of movement of the first device 402 is towards the second device 406, the first device can send the content segment that has been buffered to a personal locker 404 on the Internet. For example, to be within the first threshold, both screens may be required to be under the purview of the same Internet exchange center of the Internet service provider or be connected to the same network.

At step 714, the media guidance application transfers (e.g., via control circuitry 104 (FIG. 1)) the buffered portion stored at the personal locker 404 to the second device 406 when it is determined that the distance between the first device and the second device, 402 and 406, is within a second threshold distance. For example, the buffered portion of the media asset that was being consumed by the user at the first device 402, now temporarily stored at the user's personal locker 404 located within the internet service provider's local exchange area, can be transferred further to the user's second device 406. The second threshold distance can be associated with a distance from the second device 406 from when it is possible to or would be ideal to begin the second buffer transfer from the user's personal locker 404 to the second device 406. For example, to determine whether or not a user device is within the second threshold corresponding to the user devices, the media guidance application may base its determination on data received from a global positioning system (e.g., indicating that the user is within a particular geographical boundary and/or distance). In yet another example, to determine whether or not a user is within a predetermined proximity to the second user device 406, the media guidance application may base its determination on whether or not a user input is received indicating that the user is within or at the second threshold. Alternatively, the user may be detected to have left the viewing area of the first device or arrived at or close to the viewing area of the second device 406.

At step 716, the media guidance application generates (e.g., via control circuitry 104 (FIG. 1)) the transferred buffered portion and a remainder of the media asset at the second device for concurrent display. In this way, the methods described herein can provide a user with seamless continuation of media content with minimal interruption time between consuming that content on the user's first device 402 and continuing the content on the user's second device 406.

Figure 8:
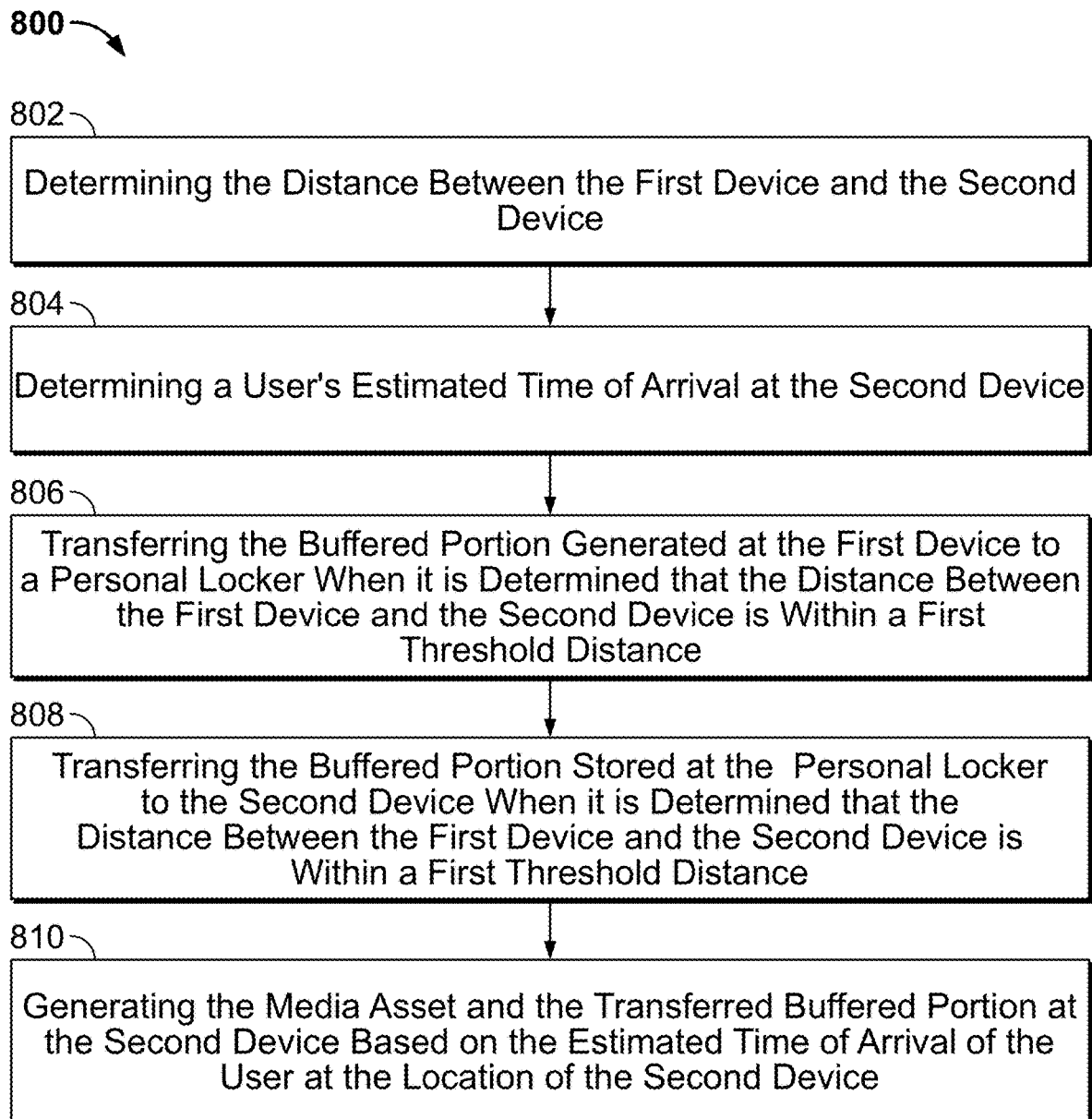
FIG. 8 shows a flowchart illustrating an example method of media content continuation based on a user's estimated time of arrival at a second user device, in accordance with some embodiments of the disclosure.

FIG. 8 is a flowchart of illustrative steps involved in determining the user's estimated time of arrival at or near the viewing area of the second device. It should be noted that process 800 or any step thereof could be performed on, or provided by, any of the devices shown in FIGS. 1-2. For example, process 800 may be executed by control circuitry 104 (FIG. 1) as instructed by a media guidance application implemented on user equipment 202, 204, and/or 206 (FIG. 2) in order to identify content providers at a device selected based on the trajectory of a user. In addition, one or more steps of process 800 may be incorporated into or combined with one or more steps of any other process or embodiment.

At step 802, the media guidance application determines (e.g., via control circuitry 104 (FIG. 1)) a distance between the first device and the second device. For example, using GPS, the system can identify the positions of the first user device and the second user device.

At step 804, the media guidance application determines (e.g., via control circuitry 104 (FIG. 1)) a user's estimated time of arrival at the second device. For example, the media asset may be generated based on a user's estimated time of arrival at the second device or, more particularly, the ETA of the user at the viewing area of the second device. In calculating the estimated time of arrival of the user, vehicle speed, remaining distance and/or traffic can be taken into account.

At step 806, the media guidance application transfers (e.g., via control circuitry 104 (FIG. 1)) the buffered portion generated at the first device 402 to a personal locker 404 when it is determined that the distance between the first device and the second device is within a first threshold distance. For example, by calculating or monitoring the distance between first and second device, 402 and 406, and if the distance between the two devices become closer and falls below or within a first threshold, i.e., the direction of movement of the first device is towards the second device, the first device can send the content segment that has been buffered to a personal locker 404 on the internet. For example, to be within the first threshold, both screens may be required to be under the purview of the same Internet exchange center of the internet service provider or be connected to the same network.

At step 808, the media guidance application transfers (e.g., via control circuitry 104 (FIG. 1)) the buffered portion stored at the personal locker 404 to the second device when it is determined that the distance between the first device and the second device is within a second threshold distance. For example, the buffered portion of the media asset that was being consumed by the user at the first device 402, now temporarily stored at the user's personal locker 404 located within the internet service provider's local exchange area, can be transferred farther to the user's second device. The second threshold distance can be associated with a distance from the second device from when it is possible to or would be ideal to begin the second buffer transfer from the user's personal locker 404 to the second device. For example, to determine whether or not a user device is within the second threshold corresponding to the user devices, the media guidance application may base its determination on data received from a global positioning system (e.g., indicating that the user is within a particular geographical boundary and/or distance). In yet another example, to determine whether or not a user is within a predetermined proximity to the second user device, the media guidance application may base its determination on whether or not a user input is received indicating that the user is within or at the second threshold. Alternatively, the user may be detected to have left the viewing area of the first device or arrived at or close to the viewing area of the second device.

At step 810, the media guidance application generates (e.g., via control circuitry 104 (FIG. 1)) the media asset and the transferred buffered portion at the second device based on the estimated time of arrival of the user at the location of the second device. For example, the media asset may be generated based on a user's estimated time of arrival at the second device 406 or, more particularly, the ETA of the user at the viewing area of the second device. For example, the vehicle speed, remaining distance and/or level of traffic can be used to calculate or determine the ETA of the user at the location of the second device 406.

Figure 9:
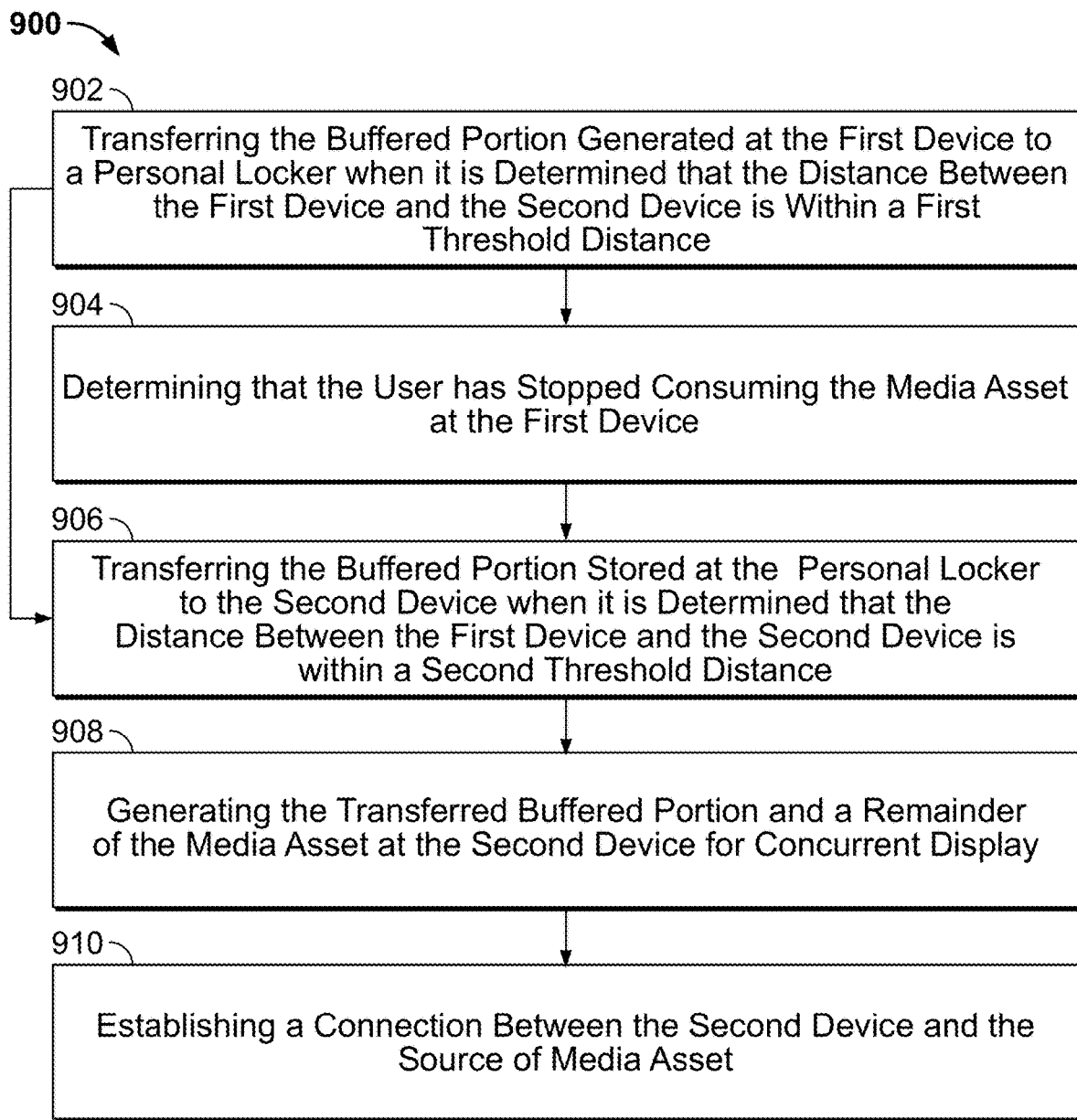
FIG. 9 shows a flowchart illustrating a further example method of media content continuation, in accordance with some embodiments of the disclosure.

FIG. 9 is a flowchart of illustrative steps involved in continuing media asset sessions across media systems or media devices that are identifiable within the same network range. It should be noted that process 900 or any step thereof could be performed on, or provided by, any of the devices shown in FIGS. 1-2. For example, process 900 may be executed by control circuitry 104 (FIG. 1) as instructed by a media guidance application implemented on user equipment 202, 204, and/or 206 (FIG. 2) in order to identify content providers at a device selected based on the trajectory of a user. In addition, one or more steps of process 900 may be incorporated into or combined with one or more steps of any other process or embodiment.

At step 902, the media guidance application transfers (e.g., via control circuitry 104 (FIG. 1)) the buffered portion generated at the first device to a personal locker 404 when it is determined that the distance between the first device and the second device is within a first threshold distance. For example, by calculating or monitoring the distance between first and second devices, and if the distance between the two devices become closer and falls below or within a first threshold, i.e., the direction of movement of the first device is towards the second device, the first device can send the content segment that has been buffered to a personal locker 404 on the Internet. For example, to be within the first threshold, both screens may be required to be under the purview of the same Internet exchange center of the Internet service provider or be connected to the same network.

At step 904, the media guidance application determines (e.g., via control circuitry 104 (FIG. 1)) that the user has stopped consuming the media asset at the first device. For example, in some embodiments, the media guidance application implemented on control circuitry may determine that a user has stopped consuming the media asset on the first device 402, or at a first location. For example, the media guidance application may determine that the user has stopped consuming the first media asset on the first device 402, or at the first location, by detecting that the user has moved from the first location corresponding to the first device 402 to a second location corresponding to any of a location away from the first device 402 (e.g., the user has left a viewing area corresponding to the first device 402), a location of the second user device 406 or a predetermined distance from the first location. Additionally or alternatively, the media guidance application may determine that the user has stopped consuming the first media asset on the first device 402 or at the first location by detecting that the user has stopped interacting with the first device 402 (e.g., the user has not used the first device for a threshold period of time).

At step 906, the media guidance application transfers (e.g., via control circuitry 104 (FIG. 1)) the buffered portion stored at the personal locker 404 to the second device when it is determined that the distance between the first device and the second device is within a second threshold distance. For example, the buffered portion of the media asset that was being consumed by the user at the first device 402, now temporarily stored at the user's personal locker 404 located within the internet service provider's local exchange area, can be transferred farther to the user's second device. The second threshold distance can be associated with a distance from the second device from when it is possible to or would be ideal to begin the second buffer transfer from the user's personal locker 404 to the second device. For example, to determine whether or not a user device is within the second threshold corresponding to the user devices, the media guidance application may base its determination on data received from a global positioning system (e.g., indicating that the user is within a particular geographical boundary and/or distance). In yet another example, to determine whether or not a user is within a predetermined proximity to the second user device, the media guidance application may base its determination on whether or not a user input is received indicating that the user is within or at the second threshold. Alternatively, the user may be detected to have left the viewing area of the first device or arrived at or close to the viewing area of the second device.

At step 908, the media guidance application generates (e.g., via control circuitry 104 (FIG. 1)) the transferred buffered portion and a remainder of the media asset at the second device for concurrent display. In this way, the methods described herein can provide a user with seamless continuation of media content with minimal interruption time between consuming that content on the user's first device 402 and continuing the content on the user's second device 406.

At step 910, the media guidance application establishes (e.g., via control circuitry 104 (FIG. 1)) a connection between the second device and the source of the media asset. For example, in some embodiments, once the second device 406 establishes its own connection to the media source, it may begin streaming the content using the newly established connection directly from the source of the stream in order to continue the media content for a user friendly experience.

Figure 10:
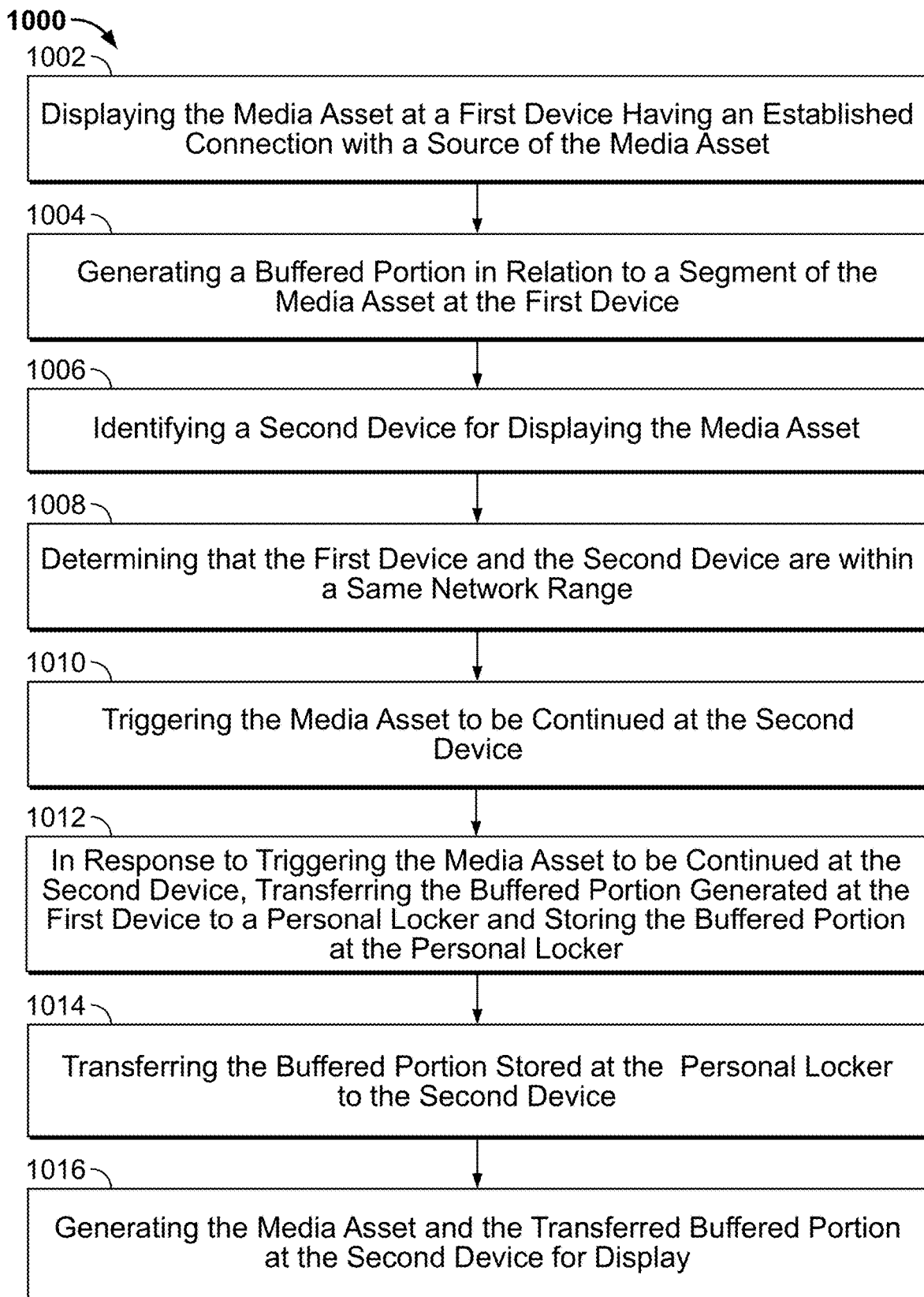
FIG. 10 shows a flowchart illustrating an example method of media content continuation when it is determined that the first device and the second device are within a same network range, in accordance with some embodiments of the disclosure.

FIG. 10 is a flowchart of illustrative steps involved in continuing media asset sessions across media systems or media devices that are identifiable within the same network range. It should be noted that process 1000 or any step thereof could be performed on, or provided by, any of the devices shown in FIGS. 1-2. For example, process 1000 may be executed by control circuitry 104 (FIG. 1) as instructed by a media guidance application implemented on user equipment 202, 204, and/or 206 (FIG. 2) in order to identify content providers at a device selected based on the trajectory of a user. In addition, one or more steps of process 1000 may be incorporated into or combined with one or more steps of any other process or embodiment.

At step 1002, the media guidance application determines (e.g., via control circuitry 104 (FIG. 1)) a media asset to be displayed at a first device 602, the first device 602 having an established connection with a source of the media asset. For example, the first device 602 may have established its own connection with the source of the content such as YouTube.

At step 1004, the media guidance application generates (e.g., via control circuitry 104 (FIG. 1)) a buffered portion in relation to a segment of the media asset at the first device 602. As referred to herein, a "buffered portion" is a length of time used to indicate a portion or segment of a media content recently consumed by a user on the first user device 602 that has been already buffered. For example, the buffered portion may begin at a point in time, otherwise described as a marker, when a user starts consuming media content on the first device 602. Alternatively, the buffered portion may begin at a point in time (i.e., the marker) where the user stops consuming media content on the first device 602 and extend forwards through time to a point in time for which the media content can continue playing without or with a lack of connection to the media source.

At step 1006, the media guidance application identifies (e.g., via control circuitry 104 (FIG. 1)) a second device 606 for displaying the media asset. For example, the media guidance application may determine one or more media devices available to the user and identify or select one of the plurality of media devices as the second device 606 for which to continue streaming media content. It may be also acknowledged that the media assets available on the second device 606 may be the same as the media assets available to the user on the first device 602 or that the second device 606 is connectable to the same content source, content provider, through the user's profile or same internet provider. For example, the media content may already be downloaded by the user.

At step 1008, the media guidance application determines (e.g., via control circuitry 104 (FIG. 1)) that the first device 602 and the second device 606 are within a same internet network range. For example, it may be determined that the first user device 602 is connected with the same Wi-Fi connection 604 as the second user device 606.

At step 1010, the media guidance application triggers (e.g., via control circuitry 104 (FIG. 1)) the media asset to be continued at the second device 606.

At step 1012, the media guidance application transfers (e.g., via control circuitry 104 (FIG. 1)) the buffered portion generated at the first device to a personal locker 404 in response to triggering the media asset to be continued at the second device 606. For example, when it is determined that the first user device 602 is connected with the same Wi-Fi connection 604 as the second user device 606, the first device 602 can send the content segment that has been buffered to a personal locker 404 on the Internet. For example, both devices may be required to be under the purview of the same Internet exchange center of the Internet service provider and be connected to the same network.

At step 1014, the media guidance application transfers (e.g., via control circuitry 104 (FIG. 1)) the buffered portion stored at the personal locker 404 to the second device 606. For example, the buffered portion of the media asset that was being consumed by the user at the first device 602, now temporarily stored at the user's personal locker 404 located within the internet service provider's local exchange area, can be transferred farther to the user's second device 606.

At step 1016, the media guidance application generates (e.g., via control circuitry 104 (FIG. 1)) the media asset and the transferred buffered portion at the second device 606 for display. In this way, the methods described herein can provide a user with seamless continuation of media content with minimal interruption time between consuming that content on the user's first device 602 and continuing the content on the user's second device.

In will be appreciated that the media guidance application may perform one or more of the function described above simultaneously.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. Additionally any of the steps in said processes can be performed in any order, can be omitted, and/or can be combined with any of the steps from any other process.

While some portions of this disclosure may make reference to "convention," any such reference is merely for the purpose of providing context to the invention(s) of the instant disclosure, and does not form any admission as to what constitutes the state of the art.

What is claimed is:

1. A method of providing continuity of availability of a media asset across devices, the method comprising:
   displaying the media asset at a first device having an established connection with a source of the media asset;
   generating a buffered portion in relation to a segment of the media asset at the first device;
   determining a user's trajectory by comparing a first location at which the user started watching the media asset with a current location;
   identifying a second device for displaying the media asset based on the trajectory;
   determining a distance between the first device and the second device;
   determining a user's estimated time of arrival at the second device based on any one or more of: user velocity; user trajectory; traffic; and/or a remaining distance between the first and second device;
   transferring the buffered portion generated at the first device to a personal locker when it is determined that the distance between the first device and the second device is within a first threshold distance;
   transferring the buffered portion stored at the personal locker to the second device when it is determined that the distance between the first device and the second device is within a second threshold distance;
   generating the transferred buffered portion and a remainder of the media asset at the second device for concurrent display, wherein the media asset and the transferred buffered portion are generated at the second device based on the estimated time of arrival of the user at the second device to begin displaying the segment of the media asset at the second device upon the user's estimated time of arrival; and
   establishing a connection between the second device and the source of the media asset.

2. The method of claim 1, wherein the step of transferring the buffered portion of the media asset to the second device is performed when it is further determined that the user has stopped consuming the media asset at the first device.

3. The method of claim 1, wherein the step of transferring the buffered portion from the first device to the personal locker further comprises a step of transcoding the buffered portion based one or more parameters for the second device, the parameters comprising: aspect ratio; video resolution size; video format; and/or encryption.

4. The method of claim 1, wherein the steps of generating the transferred buffered portion at the second device and establishing the connection between the second device and the source occur substantially simultaneously.

5. The method of claim 1, further comprising a step of determining a marker in relation to a time frame at which it is determined that the user has stopped consuming the media asset at the first device and displaying the media asset at the second device starting from the determined marker.

6. The method of claim 5, further comprising a step of determining a predetermined time period prior to the marker for rewind.

7. The method of claim 6, wherein the predetermined time period prior to the marker is based on a user profile and/or a user preference.

8. A method of providing continuity of availability of a media asset across devices, the method comprising:
   displaying the media asset at a first device having an established connection with a source of the media asset;
   generating a buffered portion in relation to a segment of the media asset at the first device;
   determining a user's trajectory by comparing a first location at which the user started watching the media asset with a current location;
   identifying a second device for displaying the media asset based on the trajectory;
   determining a distance between the first device and the second device;
   determining a user's estimated time of arrival at the second device based on any one or more of: user velocity; user trajectory; traffic; and/or a remaining distance between the first and second device;
   transferring the buffered portion generated at the first device to a personal locker when it is determined that the distance between the first device and the second device is within a first threshold distance;
   transferring the buffered portion stored at the personal locker to the second device when it is determined that the distance between the first device and the second device is within a second threshold distance;
   generating the transferred buffered portion and a remainder of the media asset at the second device for concurrent display; and
   establishing a connection between the second device and the source of the media asset, wherein the connection between the second device and the source is established based on the estimated time of arrival of the user at the second device.

9. The method of claim 8, wherein the step of transferring the buffered portion of the media asset to the second device is performed when it is further determined that the user has stopped consuming the media asset at the first device.

10. The method of claim 8, wherein the step of transferring the buffered portion from the first device to the personal locker further comprises a step of transcoding the buffered portion based one or more parameters for the second device, the parameters comprising: aspect ratio; video resolution size; video format; and/or encryption.

11. The method of claim 8, wherein the steps of generating the transferred buffered portion at the second device and establishing the connection between the second device and the source occur substantially simultaneously.

12. The method of claim 8, further comprising a step of determining a marker in relation to a time frame at which it is determined that the user has stopped consuming the media asset at the first device and displaying the media asset at the second device starting from the determined marker.

13. The method of claim 12, further comprising a step of determining a predetermined time period prior to the marker for rewind.

14. The method of claim 13, wherein the predetermined time period prior to the marker is based on a user profile and/or a user preference.

* * * * *